(12) United States Patent
Sinha et al.

(10) Patent No.: US 10,425,831 B2
(45) Date of Patent: Sep. 24, 2019

(54) IMPROVING COVERAGE IN A CELLULAR NETWORK USING TEMPORARY SUBSCRIBER INDENTIFIERS

(71) Applicant: T-Mobile USA, Inc., Bellevue, WA (US)

(72) Inventors: Ruchir Sinha, Newcastle, WA (US); Maheshkumar Nagarajan, Bellevue, WA (US); Chabuk Savar Baquer Ali, Issaquah, WA (US); Anandajothi Muttayane, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/690,155

(22) Filed: Aug. 29, 2017

(65) Prior Publication Data
US 2019/0069185 A1 Feb. 28, 2019

(51) Int. Cl.
*H04W 24/00* (2009.01)
*H04W 16/18* (2009.01)
*H04W 4/021* (2018.01)
*H04W 24/08* (2009.01)
*H04W 64/00* (2009.01)
*H04W 28/24* (2009.01)
*H04W 48/16* (2009.01)

(52) U.S. Cl.
CPC .......... *H04W 16/18* (2013.01); *H04W 4/021* (2013.01); *H04W 24/08* (2013.01); *H04W 64/006* (2013.01); *H04W 28/24* (2013.01); *H04W 48/16* (2013.01)

(58) Field of Classification Search
CPC ..... H04W 16/18; H04W 4/021; H04W 24/08; H04W 64/006; H04W 28/24; H04W 48/16
See application file for complete search history.

(56) References Cited

U.S. PATENT DOCUMENTS

| 7,206,573 | B1 | 4/2007 | Weaver et al. | |
|---|---|---|---|---|
| 2003/0008659 | A1* | 1/2003 | Waters | H04W 4/04 455/456.1 |
| 2005/0064879 | A1 | 3/2005 | McAvoy | |
| 2009/0143065 | A1* | 6/2009 | Mattila | H04L 41/06 455/423 |

(Continued)

FOREIGN PATENT DOCUMENTS

WO WO2010107223 A2 9/2010

OTHER PUBLICATIONS

The PCT Search Report and Written Opinion dated Nov. 9, 2018 for PCT Application No. PCT/US2018/043309, 10 pages.

*Primary Examiner* — Pakee Fang
(74) *Attorney, Agent, or Firm* — Lee & Hayes, P.C.

(57) ABSTRACT

A geolocation of a mobile device determined during an event allows a communications network provider to associate geolocation data with QoS issues. The geolocation data may be ascertained by mapping call log data with a temporary subscriber identifier assigned by the communications network provider. Geolocation data may also be obtained from URL data. The geolocation data obtained from URL data may be verified by comparing the URL data with a geo-distance from a connected cell tower. The QoS issue can be associated with geolocation data and subsequently used to improve the network or strengthen the coverage at the geolocation.

10 Claims, 6 Drawing Sheets

(56) References Cited

U.S. PATENT DOCUMENTS

| | | | |
|---|---|---|---|
| 2010/0048199 A1 | 2/2010 | Forslow | |
| 2011/0122773 A1* | 5/2011 | Kung | H04L 41/0631 370/241 |
| 2011/0275364 A1* | 11/2011 | Austin | H04L 41/06 455/423 |
| 2016/0174081 A1 | 6/2016 | Lau | |

* cited by examiner

IMPROVING COVERAGE IN A CELLULAR NETWORK USING TEMPORARY SUBSCRIBER INDENTIFIERS

BACKGROUND

As mobile wireless communication devices continue to become increasingly ubiquitous, radio access providers strive to provide widespread and robust coverage for the wireless communication devices that subscribe to its services. While many radio access providers may have a general sense of the quality of service a subscriber may expect to receive in a certain geographic area, it can be difficult for a radio access provider to pinpoint, with any degree of accuracy, an area that is prone to issues that may affect the quality of service a subscriber may experience.

An event, such as a voice call, a web browsing session, a video chat, a media download or streamed file, or other type of voice or data communications event, will have an associated quality of service, which can vary widely based upon geography, including any obstructions that may degrade the service at a particular location.

The historical inability to accurately determine quality of service issues based upon geography has led to a poor customer experience due to dropped calls, increased buffering times, increased download times, and in some cases, no usable service.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
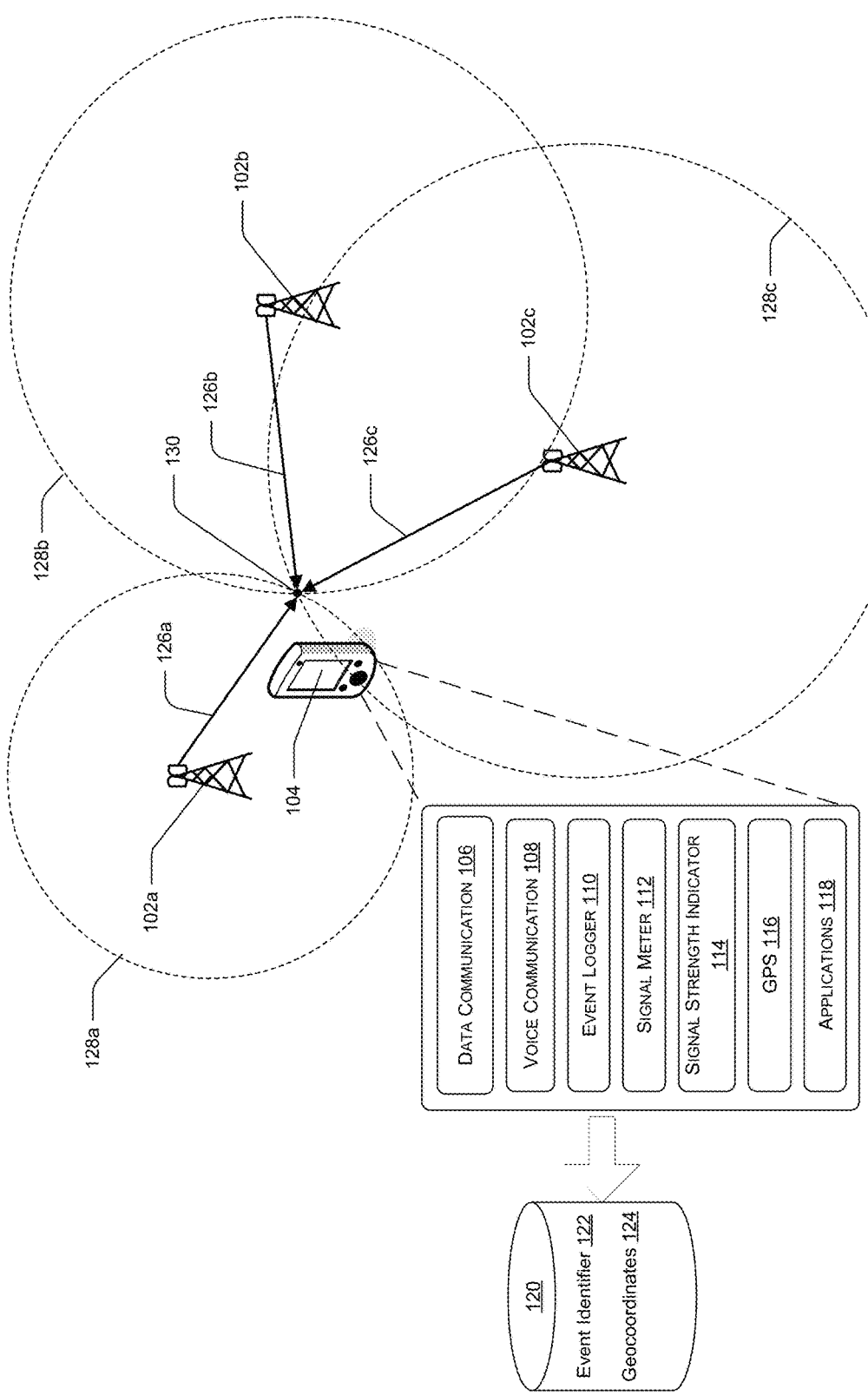
FIG. 1 illustrates an overview of a networking system for providing event issues geolocated through extracting coordinates from a communication session.

This disclosure describes, in part, a system and method for improving the quality of service in a radio network through extracting geographic coordinates from communication sessions. As use herein, quality of service ("QoS") is a measure of the overall performance of a service, and is used to refer to all forms of wireless communication, which include voice and data communication. More specifically, QoS can relate to one or more of audio quality, video quality, latency, buffering, download speed, upload speed, resolution, response time, signal-to-noise ratio, echo, interrupts, cross-talk, loudness levels, packet prioritization, packet loss, bit rate, bit error rates, or any combination and generally is at least partially responsible for the customer experience over a wireless communications network.

When a mobile computing device communicates over a wireless communications network, such as, for example, a radio access network, which may also be referred to as a cellular network, the coverage generally varies with location. The signal strength from a radio access tower varies with distance. Therefore, as a mobile computing device moves relative to a radio access tower, the signal strength varies generally proportionally to the distance from the tower. Moreover, obstructions may alter the signal strength received by the mobile computing device. For example, if the mobile computing device is located indoors, in a downtown urban environment with obstructing buildings, or in an area where naturally occurring obstructions prevent a line of sight to the radio access tower, the signal strength may be affected.

Moreover, as a mobile computing device moves throughout a coverage area, the mobile computing device may connect to two or more radio access towers and the towers execute a handoff from one tower to the other tower. Depending on the relative distance (and hence, signal strength) between the mobile computing device and the towers, the QoS may be affected, and in some cases, there may be a lack of service. This is exhibited by dropped calls, long buffering times, and sometime unavailability of network communication services.

Historically, radio access providers understand the coverage provided by their services, at a high level, and may even provide coverage maps to their subscribers and potential subscribers. However, the coverage maps are typically very general and may not provide a resolution specific enough to identify a signal strength at a precise latitude and longitude. Thus, it becomes difficult for a radio access provider to precisely identify geographic areas that have QoS issues.

It would be a significant improvement to existing radio communication networks if QoS could be quantified by identifying event issues and geolocating the event issues, such as by associating geolocation coordinates to the event issue, for further trouble shooting and network improvement.

The following description provides implementations for improving a radio access network through its ability to detect and identify event issues and to associate the event issues with geolocation coordinates. An event may be associated with voice or data communication over the radio access network. For example, initiating a voice call, receiving a voice call, terminating a voice call, dropping a voice call, beginning of a data session, streaming media start/stop/interruption, downloading file start/stop/interruption, and initiating a web browsing session, are all non-limiting and non-exhaustive examples of events.

In connection with the ability to identify events in conjunction with an ability to determine a location at which the event transpires, a radio access network can be improved. For instance, where a number of negative events occur within a geographic area above a threshold number of negative events, the radio access provider can improve the coverage within that geographic area to provide an improve QoS to its subscribers. A "negative event" can be any type of event that may result in a poor customer experience. For example, dropped calls, the inability to send or receive data, and data download speeds below a threshold, are all examples of a negative event. Any of these "negative events" may be indicative that the QoS is below a threshold, thereby indicating an event issue.

The geolocation of an event may be determined through a number of ways. A cellular tower, or simply tower, provides coverage to an area surrounding the tower. The coverage area may be referred to as a cell. While a radio access provider generally knows which tower the mobile computing device is connected to, it may not know the specific location of the mobile computing device within the cell. However, the mobile computing device may be in communication, even periodic communication, with multiple towers simultaneously. The strength of the communication signal between the mobile computing device and the towers is related to the distance (among other things) between the mobile computing device and the tower. Where the mobile computing device is in communication with multiple towers, the location of the mobile computing device may be determined based upon its signal strength to the towers.

The location of the mobile computing device may be determined through multilateration of radio signal between multiple towers of the network and the mobile computing device. This relies upon measuring power levels between multiple towers and is one network-based technique for locating a mobile computing device that is non-intrusive to the user of the mobile computing device. Location information may be ascertained through any suitable method, such as triangulation, trilateration, or GPS coordinates sent from the mobile computing device.

Another method of determining the geolocation of an event is to use application data sent from the mobile computing device to an application server. This method provides the benefit that the application server need not be in the control or operation of the radio access provider. Any of a number of independently developed and published applications that run on mobile computing device provide location data to the application server. As an example, an application that provides map or navigation information may send location coordinates to an application server. Likewise, augmented reality applications may send location information over the radio access provider's network. In many cases, the location information sent by an application executing on the mobile computing device includes the location data embedded in a uniform resource locator ("URL") sent over the hypertext transfer protocol to a web server.

Oftentimes, the location information sent by an application executing on the mobile computing device may be delayed, may be sent as an agglomeration of multiple location points, or may send false location information. One way to filter the false coordinates and verify the accurate coordinates is to determine the coordinates of the tower to which the mobile computing device is connected and compare the tower coordinates with the location coordinates sent by the application. This provides a quick verification of the coordinates sent by the application to ensure that they are likely accurate.

FIG. 1 illustrates an overview of a system 100 for associating geolocation data with event issues. A radio access provider may provide one or more transmitters, 102a, 102b, and 102c. The transmitters may be any suitable type of transmitter or transceiver, and may be provided as cellular towers, among other things.

In addition, or in the alternative, the radio access provider may comprise any one or more base stations, node Bs, eNode Bs, or wireless access points (e.g., Wi-Fi access points, WiMax access points, etc.). The radio access provider may include components fixing the radio access provider to a location and positioning the radio access provider at that location, such as components of a cell tower. To provide wireless connectivity to the telecommunication network, the radio access provider may be equipped with any number of components, such as radio antennas, transmitter components, receiver components, power amplifiers, combiners, duplexers, encoder components, decoder components, band pass filters, power sources, or control components. The radio access provider may also include one or more carrier servers, such as a server or server farm, multiple, distributed server farms, a mainframe, a work station, a personal computer (PC), a laptop computer, a tablet computer, an embedded system, or any other sort of device or devices.

A mobile computing device 104 is configured to communicate with the base stations 102a. In various implementations, the mobile computing device 104 may be any sort of computing device known in the art that is capable of communicating over one or more frequency bands. Examples of suitable mobile computing devices 102 include a PC, a laptop computer, a tablet computer, a telecommunication device, a smartphone, a cell phone, a personal digital assistant (PDA), a media player, a media center device, a personal video recorder (PVR), an electronic book reader, a camera, a video game console, a kiosk, a wearable computing device, a virtual reality headset, smart glasses, a gaming device, an electronic device for inclusion in vehicles, a gaming device, or any other sort of device.

The mobile computing device 104 can be configured with hardware and software necessary for data communication 106 and voice communication 108. The mobile computing device 104 can additionally be outfitted with an event logger 110, a signal meter 112, a signal strength indicator 114, hardware necessary to implement a global positioning system ("GPS") 116, and one or more applications 118.

The mobile computing device may additionally store information, such as in a database 120. The information may include an event identifier 122 and geocoordinates 124. The database 120 may be a local database, or may be saved remotely from the mobile computing device 104, such as on a server maintained by the radio access provider. In some examples, a local database 120 is stored and information is agglomerated in the local database and then sent to be stored on a server maintained by the radio access provider.

The ability of the mobile computing device 104 to conduct data communication 106 allows the mobile computing device 104, for example, to initiate web browsing sessions or stream media. Information regarding the data communication 106, such as bit rate, signal strength, and buffering times, for example, can be stored in the database 120.

In those implementations in which the mobile computing device 104 is capable of conducting voice communication 108, details regarding the voice communication event may be stored in the database 120. Event details may include call initiation or reception time, an identification of the devices communication with one another, such as telephone numbers, sim card numbers, subscriber identification, or the like. A voice call may result in multiple events associated with each call, and one or more of these events may be recorded in the database 120. For instance, separate events may occur when a call is initiated, when it is purposefully terminated, or if a call is dropped. These events may each have a unique event identifier, time of occurrence, and other such information associated with the event.

An event logger 110 may record the details of events to the database 120. Moreover, the event logger 110 may send event details to a server maintained by the radio service provider for storage and further processing. In some cases, the event logger 110 may periodically send the event details stored in a local database 120 to the radio access provider, or may immediately send the even details.

In some cases, a signal meter 112 is provided as part of the mobile computing device 104. The signal meter 112 is capable of receiving a wireless signal and data associated with the signal. Data associated with the signal may include time data, such as from transmitters 102a and 102b. The time of arrival of the transmitted signals at the mobile computing device 104 can be used to determine the distance between the mobile computing device 104 and the two transmitters 102a, 102b, thus providing geocoordinates of the mobile computing device 104. The length of the arrows 126a, 126b, and 126c corresponds to the arrival time at the mobile computing device 104 of the synchronized signals broadcast by the transmitters 102a, 102b, and 102c.

Where a single signal from a single transmitter 102a is received, its time of arrival determines the length of arrow 126a. Thus, the location of the mobile computing device 104 relative to the transmitter 102a is defined as circle 128a having a radius of arrow 126a. By introducing a signal from a second transmitter 102b, this further defines the location of the mobile computing device 104. As shown in the figure, with a known distance from a first transmitter 102a and a second transmitter 102b, there are two locations where the mobile computing device 104 could be located—where the first circle 128a intersects the second circle 128b. By introducing a third transmitter 102c and receiving a distance measurement from the third transmitter 102c, the location of the mobile computing device 104 is then precisely determined where the circles 128a, 128b, and 128c intersect at a location point 130. This simplistic example of trilateration is an effective way to ascertain the position of a mobile computing device 104. With the known geocoordinates of the transmitters 102a, 102b, and 102c, and the relative distance of the mobile computing device 104 from the transmitters, the geolocation of the mobile computing device 104 can be ascertained.

Similar to the trilateration example provided above, where the signals sent from multiple transmitters are synchronized, the time of arrival at the mobile computing device 104 allows the geocoordinates of the mobile computing device 104 to be determined. One advantage of this multilateration approach is that the mobile computing device 104 and the transmitters don't need to be synchronized.

The mobile computing device 104 may further include a signal strength indicator 114. This can determine the strength of the signal received from the transmitter 102a, 102b, and 102c. Since signal strength is related to distance, this measurement can also be used to determine the distance from one or more transmitters, and thus, be used to determine geocoordinates of the mobile computing device 104.

The mobile computing device 104 may include the necessary hardware and/or software to implement a GPS 116. This may allow the mobile computing device 104 to directly provide its geolocation to the radio access provider, which may be provided periodically, may be polled by the radio access provider, or may be provided with event details. For example, when the mobile computing device 104 experiences an event (e.g., initiates a call, drops a call, requests a media stream, launches an application, buffers data, etc.), the mobile computing device 104 may send GPS data that identifies the geolocation of the mobile computing device 104 at the time of the event.

The mobile computing device 104 may further include one or more applications 118 that can be executed. In some cases, the applications 118 may send geolocation coordinates to an application server, which may be controlled and operated by a third party entity that is different from the radio access provider. Where the mobile computing device 104 is communicating through the equipment provided by the radio access provider, such as a cellular tower 102a, the data sent and received by the application goes through the network of the radio access provider. Consequently, the radio access provider has access to the URL data sent and received by the mobile computing device 104.

Where the mobile computing device 104 is executing an application that uses geolocation data, the geolocation coordinates may be sent as part of a URL. For example, the URL data may be in the general form of http://domain.com/location/<latitude1><longitude1>&<latitude2><longitude2>&<latitude3><longitude3>. The URL data may provide multiple sets of geolocation data which may have been ascertained and recorded over a period of time. Such applications that provide geolocation data include map applications, navigation system applications, social media applications, and many other such applications that ascertain and send geolocation data of the mobile computing device 104.

Through any of the methods through which the mobile computing device 104 ascertains or sends geolocation coordinates, they may be stored in the database 120 and associated with an event.

Figure 2:
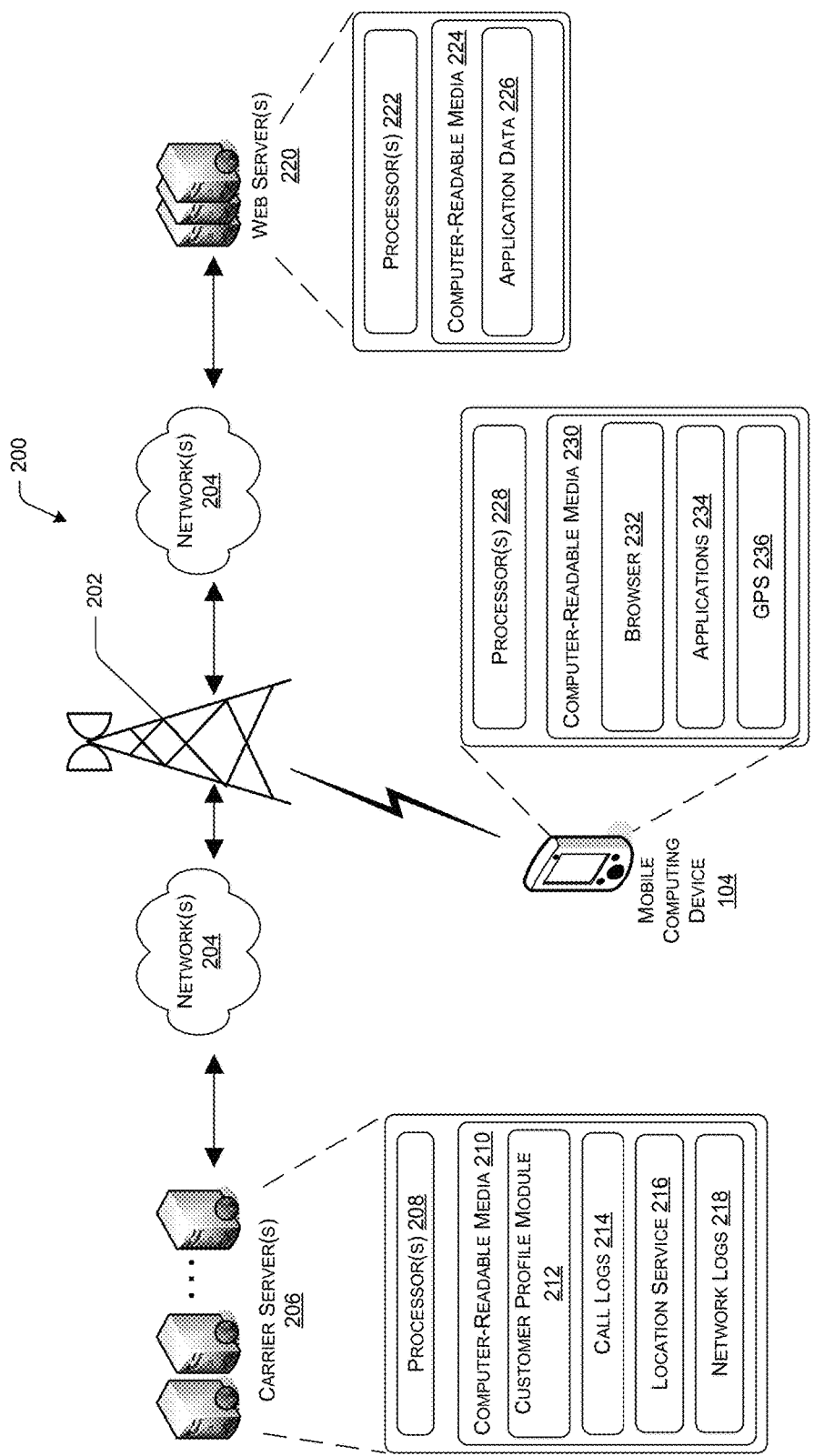
FIG. 2 illustrates an overview of a system for providing event issues geolocated through extracting coordinates form a communication session.

With reference to FIG. 2, a system 200 for providing event issues that are geolocated through extracting coordinates form a communication session is illustrated. A mobile computing device 104 communicates wirelessly with the network of a radio access provider, such as a cellular tower 202. The cellular tower 202, in turn communicates with one or more servers over a network 204. The network 204 may be the internet, or may be another form of local area network or wide area network.

The radio access provider may maintain one or more carrier servers 206. In some implementations, the carrier servers 206 have one or more processors 208 and computer-readable storage media 210. The computer-readable storage media 210 is non-transitory and may store various instructions, routines, operations, and modules that, when executed, cause the processors to perform various activities. In some implementations, the one or more processors 208 are central processor units (CPU), graphics processing units (GPU) or both CPU and GPU, or any other sort of processing unit. The non-transitory computer-readable storage media may include volatile and nonvolatile, removable and non-removable tangible, physical media implemented in technology for storage of information, such as computer readable instructions, data structures, program modules, or other data. System memory, removable storage, and non-removable storage are all examples of non-transitory computer-readable media. Non-transitory computer-readable storage media may include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the carrier servers 206.

As illustrated in FIG. 2, the computer-readable storage medium 210 of the carrier servers 206 maintains various modules, such as a customer profile module 212, one or more call logs 214, a location service 216, and one or more network logs 218. Of course, other modules may be included and may be configured with instructions to carry out various other tasks not further described herein.

The carrier servers 206 may be configured to communicate with a network 204, such as the internet, to exchange voice and data communications with the mobile computing device 104. Additional servers and devices may be configured to likewise communicate with the network 204, such as one or more web servers 220.

The web servers 220 may have one or more processors 222 similar to the processors 208 already described. The web servers 220 may likewise have computer-readable media 224, as previously described. The web servers may additionally have application data 226. The application data 226 can be data that is exchanged with the mobile computing device 104 as will be described in further detail.

The mobile computing device 104 contains one or more processors 228 which may be similar or identical to the processors contained in the carrier servers 206, and may additionally have similar memory 230 as described with reference to the carrier servers 206. That is, the memory 230 associated with the mobile computing device 104 is non-transitory and contains modules, programs, or instructions that can be executed to perform various functions.

The mobile computing device 104 includes a browser 232, such as an internet browser that allows the mobile computing device 104 to receive and display information from the internet. It may also include one or more applications 234 and necessary hardware and software to implement a GPS 236.

In use, the mobile computing device 104 communicates, via the network 204, with other devices. In many instances, the communication is cellular communication that occurs through a network provided by a radio access provider, such as a cellular tower 202. The communication includes data packets that are routed through equipment, such as the carrier servers 206, to ultimately reach the destination. As the traffic passes through the carrier servers 206, the carrier servers 206 are able to ascertain information about the data as well as the subscribers that is associated with the mobile computing device 104. For instance, the carrier servers 206 can determine the phone number of the mobile computing device 104 that initiates data or voice communication. The phone number is linked with a customer profile, which is maintained by the customer profile module 212. Through this association, data sent and received by the mobile computing device 104 is linked with a particular account and subscriber.

Additionally, the carrier servers 206 maintain one or more call logs 214 which can be used to record information associated with voice calls made from or to the mobile computing device 104. The call logs 214 may include information such as the identification of the mobile computing device 104 (e.g., phone number, temporary subscriber identifier, or some other identification or combination of identifiers), the time the call was placed, the duration of the call, the identification of the cell through which the call was routed. The call logs 214 may additionally include event identifiers that identify a specific event, such as, for example, a placed call, a received call, a dropped call, or a handover from one cell to another.

The location service 216 can determine information related to a location of a mobile computing device 104. As described, location information can be determined through any suitable technique, such as, for example, triangulation, trilateration, or multilateration. Additionally, the mobile computing device 104 may send GPS coordinate data which can be stored by the location service 216.

The carrier servers 206 may also contain network logs 218, which can store information related to data packets sent to or from the mobile computing device 104 that route through the network 204 of the radio access provider. Some examples include an event, the time of the event, a temporary subscriber identifier, or a device identifier, among other things.

The mobile computing device 104 may also send data through the network 204 to one or more web servers 220. The web servers 220 may or may not be controlled by the radio access provider. In some cases, the web servers 220 may contain application data 226. The mobile computing device 104 can store and execute one or more applications 234 that exchange data with the web servers 220. As non-limiting examples, the mobile computing device 104 may execute a maps application that can display a map with the current location of the mobile computing device 104. The current location of the mobile computing device 104 can be sent to the web server 220 and the web server 220 may send directions to allow the user of the mobile computing device 104 to proceed to a destination. Through updating of the current location of the mobile computing device 104 at intervals, the display of the mobile computing device 104 can show a progress indicator, or may update the current location of the mobile computing device 104 to enable a user to track her progress toward the destination. The current location data can be sent to the web server 220 to be stored as application data 226.

In some implementations, the data sent by the mobile computing device 104 to the web servers 220 will be in the form of a URL. The URL may contain location data which can be extracted and stored by the web servers 220 as application data 226. Because data from the mobile computing device 104 is routed through the network 204 operated by the radio access provider, the radio access provider is privy to the data, including the URL data that is sent to the web servers 220. The radio access provider, thus, can parse the URL data and extract location data that is sent to the web servers 220. However, when receiving location data embedded within URL data, there may be some inaccuracies. For example, many applications 234 may collect geolocation information at intervals and send multiple sets of the geolocation information at the same time. Consequently, when URL data contains multiple sets of geocoordinates, it is difficult to ascertain which sets of coordinates are the most accurate. However, this problem can be ameliorated by comparing the multiple sets of geocoordinates with known geocoordinates as described below.

Figure 3:
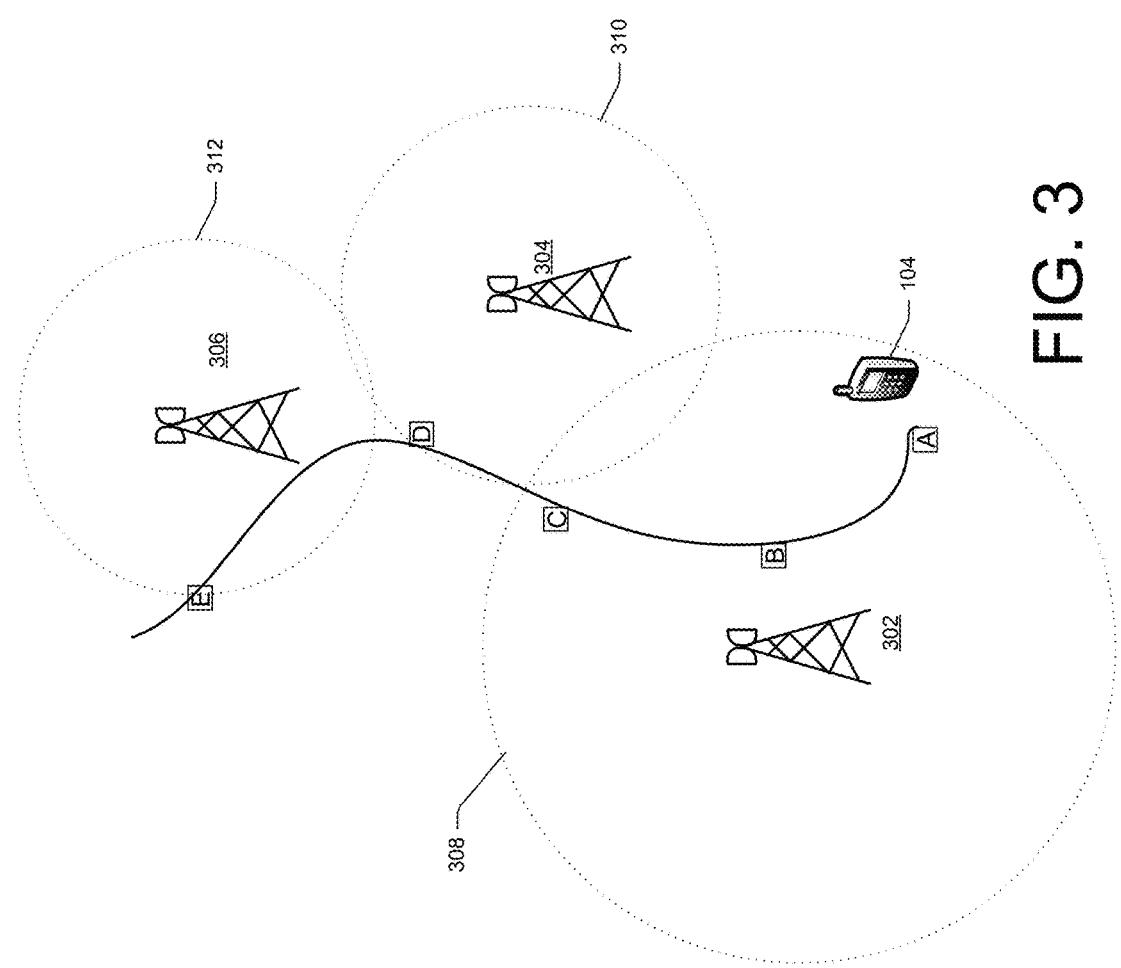
FIG. 3 illustrates a sample mobile communication network and a mobile communication device as it moves throughout the network.

With reference to FIG. 3, a cellular towers 302, 304, and 306 define cells 308, 310, and 312 respectively. Together, these towers form a cellular network that allows a mobile computing device 104 to communicate with other devices. During use, the mobile computing device 104 may move from one location to another, such as is represented by boxes labeled "A", "B", "C", "D", and "E." The mobile computing device 104 may initiate a voice call while at position A, and will thus initially connect to the network through tower 302. When the call is initiated and the mobile computing device 104 executes a handshake with the network through the tower 302, the call log 214 on the carrier servers 206 can record information associated with the voice call, such as, for example, the call event, the time, the cell tower 302 through which the call was initiated, among other things. Similarly, when the call terminates, this event can likewise be recorded. However, while the event may be recorded in the call log 214, the location information is not present as part of the data records saved as part of the call log 214. The position of the tower 302 is known, but the relative position of the mobile computing device 104 may not be known.

By its nature, a mobile computing device 104 may travel during a communication session, or in between communication sessions. For example, a call may be placed while the mobile computing device 104 is at point A, and the mobile computing device 104 may travel through point B, point C, and continue toward point D. During the period of travel, the strength of the signal between the tower 302 and the mobile computing device 104 may vary with distance and with obstacles. Around point C, the mobile computing device 104 may communicate with tower 304 and the network may initiate a handover of the mobile computing device 104 from the first tower 302 to the second tower 304. However, if the mobile computing device 104 experiences a dropped call, the call logs 214 may not register that the call dropped when the mobile computing device 104 was connected to the second tower 304 because they may only record that the call was initiated on the first tower 302.

In reality, if someone makes call while driving, the call logs 214 may record that a call was initiated at a particular time, from the certain cell phone number, and which tower the call was initiated through. After ten minutes of driving, the mobile computing device 104 may be connected to a third tower 306 at which time the call drops. At this point, the call logs 214 have only saved data associated with the identity of the device that made the call, the time of the call, and the tower through which the call was initiated. The call logs 214 may not reflect that the call was dropped from the third tower 306. However, as described above, the estimated position of the mobile computing device 104 can be determined through a suitable network hardware based method, such as triangulation, trilateration, multilateration or some other method. Accordingly, when the call drops, the geocoordinates of the mobile computing device 104 are generally known, which allows the radio access provider to determine the likely tower that the mobile computing device 104 was connected to when the call was dropped. However, this problem is exacerbated in dense areas where cell towers have significant overlap.

For example, in a dense urban environment, there may be dozens of cell towers in a square mile, some of which may be located in very close proximity to one another. In the example of dropped calls, the call logs may indicate which cell tower is dropping the calls; however, an exact location within the cell where calls are being dropped may not be readily apparent.

Similar to the dropped calls, buffering times of streaming media may also vary based upon location within a particular cell. For example, the buffering time at point C may be significantly longer than the buffering time at point D. By associating the buffering event, with the buffering time, the bit rate, and the location, issues within the network can be identified and the network can be improved at those locations exhibiting event issues.

Figure 4:
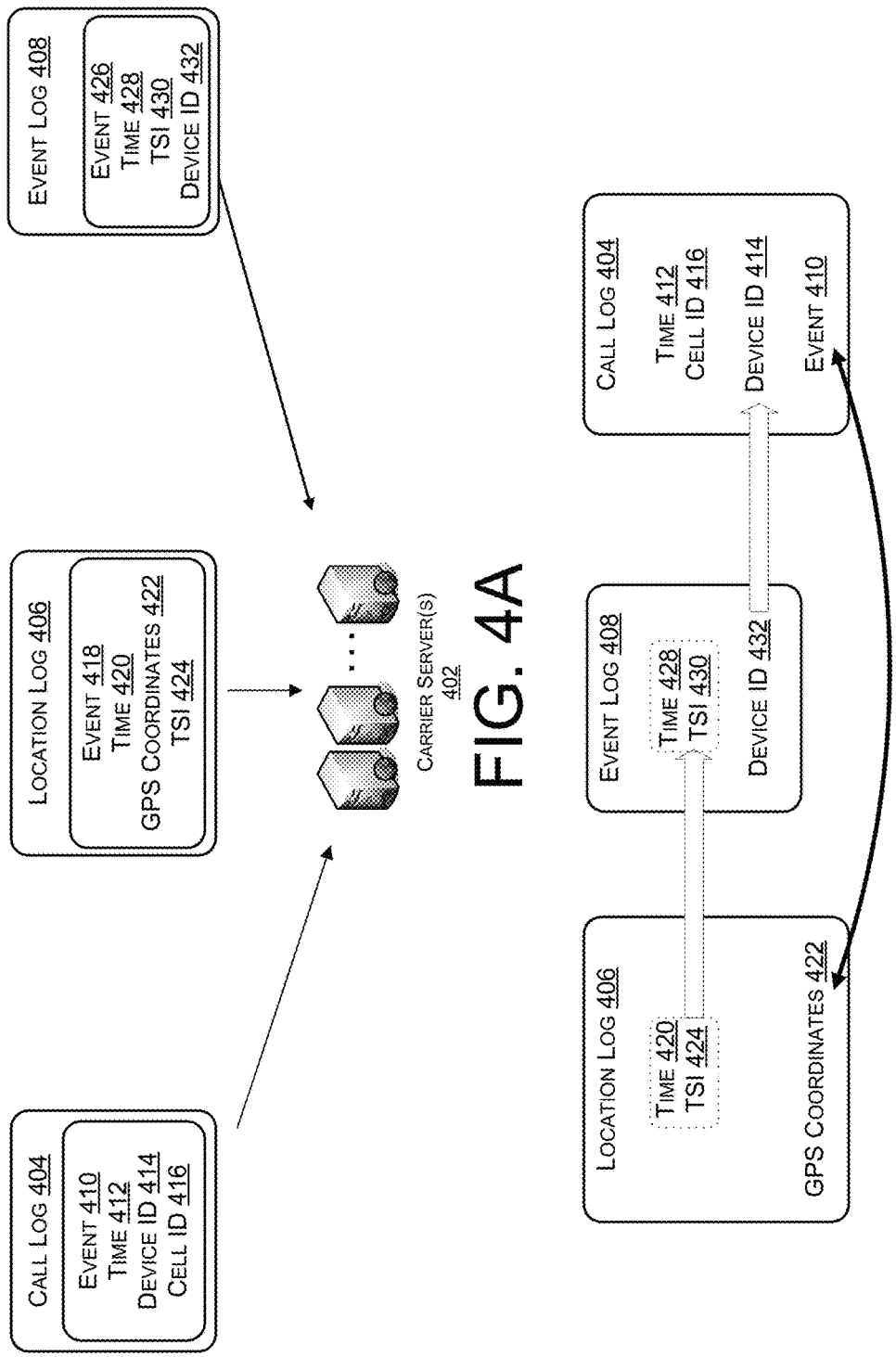
FIGS. 4A and 4B illustrate an example system for correlating event issues, geographical coordinates, and subscriber identification.

With reference to FIG. 4, the carrier servers 402 are illustrated along with some of the logs and associations that can be made between the data found within the various logs. For example, the carrier servers may store, or have access to, a call log 404, a location log 406, and an event log 408. The call log 404 may store data associated with voice communication sessions. Some of the data may include an event 410, such as an outgoing or incoming call, a dropped call, audio quality of the call, or some other information associated with a voice call event. The data may also include the time 412 of the event 410, the device ID 414 associated with the event, and a cell ID 416. The device ID 414 may be any information useful to identify the mobile computing device that is involved in the event. In some instances, the device ID 414 may be a telephone number assigned to the mobile computing device by the radio access provider. The cell ID 416 may be an identifier for the specific cell tower that operates as a wireless transceiver to allow the mobile computing device to conduct wireless communication.

The location log 406 may include information related to the location, or speculated location, of a mobile computing device connected to the network of the radio access provider. The information in the location log 406 may include, for example, an event 418, a time 420 associated with the event, GPS coordinates 422 of the event, and a temporary subscriber identifier ("TSI") 424.

The GPS coordinates 422 associated with an event 418 may be ascertained as described herein, such as by network hardware methods including triangulation, trilateration, multilateration, or by the device sending GPS coordinates, or by some other method or combination of suitable methods. A TSI may typically be assigned to a mobile computing device as it connects to the network provided by the radio access provider and may occur during an initial handshake process. The TSI 424 is assigned to a device for a period of time, after which the TSI 424 is recycled and a new TSI 424 is assigned to a mobile computing device for future communication sessions. The TSI 424 is established for the purpose of, among other things, shielding the true identification of the mobile computing device from other parties detecting the true ID and being able to identify subscribers.

The event log 408 maintains information specific to an event 426, such as the time 428 of the event, the TSI 430 associated with the event 426, and the device ID 432 associated with the mobile computing device. The device ID 432 may be a telephone number, a SIM card number, or some other type of device-specific identification.

In an example, the goal is to correlate the event, with the time, the geolocation of the event, and the subscriber experiencing the event. By creating an association between this information, additional steps can be taken to troubleshoot the issues and improve the coverage and reliability of the network at specific geolocations.

One issue is that there is not a data source that allows a direct correlation between the event, the geolocation, and the subscriber. While the information may exist is disparate locations, the carrier servers 402 can be configured to extract the necessary information and make the required associations.

For example, with reference to FIG. 4B, the location log 406 includes the time 420 of an event and the TSI 424 of the mobile computing device involved in the event. While the location log 406 additionally includes GPS coordinates 422, this information is not readily associated with the event 410 or the device ID 414. However, the time 420 and TSI 424 within the location log 406 can be compared with the time 428 and TSI 430 stored within the event log 408. Because the TSI 424 is recycled regularly, the time 420 needs to additionally be compared to correlate the data in the location log 406 with the data in the event log 408. The event log 408 additionally includes the device ID 432.

Because a radio access provider may collect data on millions of events per day, it becomes difficult to create associations that rely on time and event alone. For example, a radio access subscriber may maintain a call log that indicates upwards of ten million calls (event) were placed every day, or on average, about seven thousand calls every second (time). Consequently, additional data points are preferable to ensure the same event is associated with a specific subscriber and a specific location.

The device ID 432 from the event log 408 can be associated with data from the call log 404, since the call log 404 also includes the device ID 414 and the time 412. Furthermore, the call log 404 includes the event 410 and the device ID 414 which indicates which device experienced the event 410. The data in the call log 404 can now be associated with the data in the location log 406 and an association can be created between the event 410, the device ID 414, the time 412, and the GPS coordinates 422 at which the event 410 took place.

Historically, a radio access provider may understand that a particular tower is associated with dropped calls, but may not know a location within the coverage area of the tower that is having issues with call reliability. With this association, a radio access provider is able to correlate a dropped call event with a subscriber that is experiencing a dropped call along with the geocoordinates of the dropped call. The radio access provider is now able to investigate the issue and remedy the situation.

Figure 5:
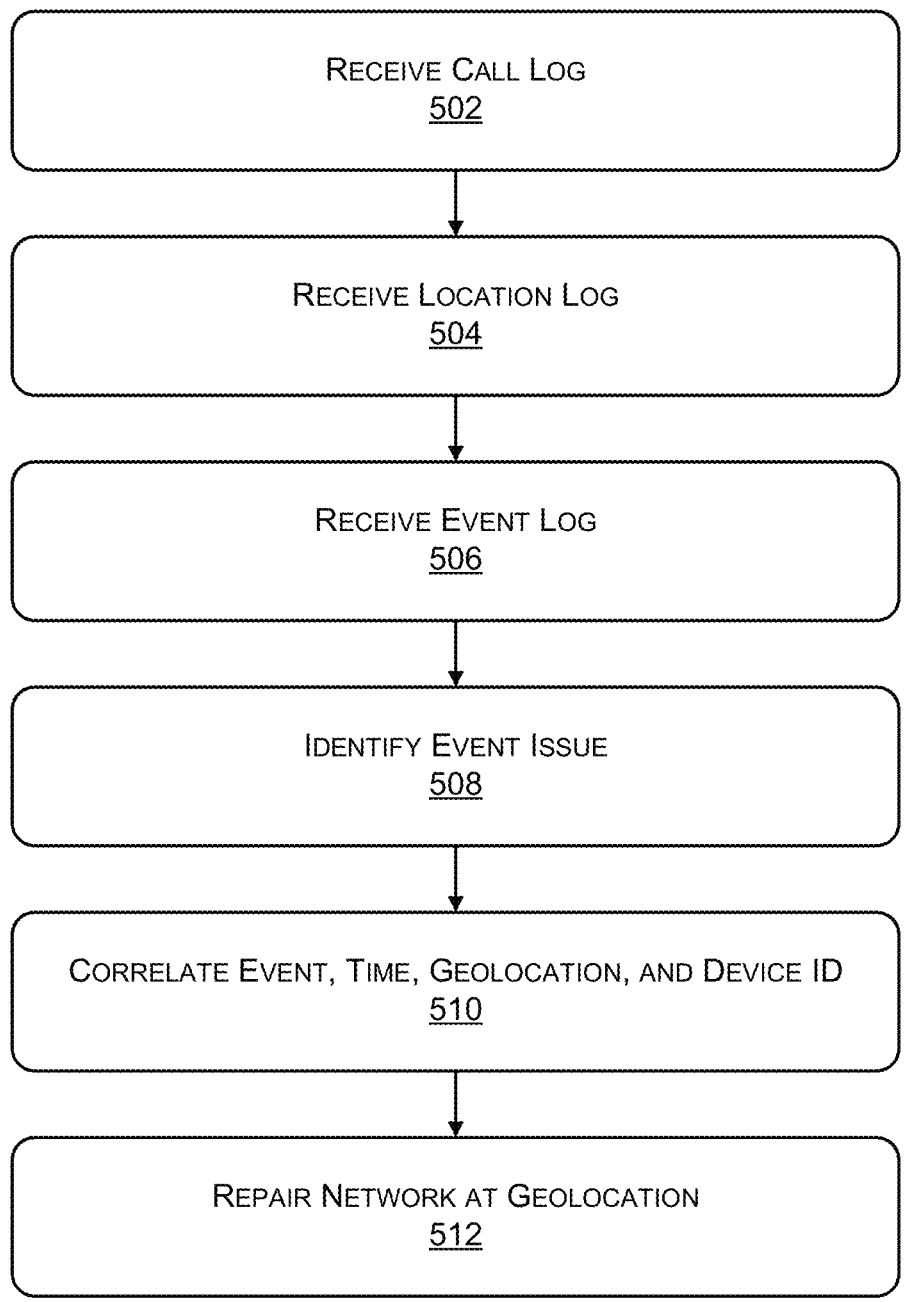
FIG. 5 illustrates an example process for a repairing a network by extracting geographic coordinates from a communication session.
Figure 6:
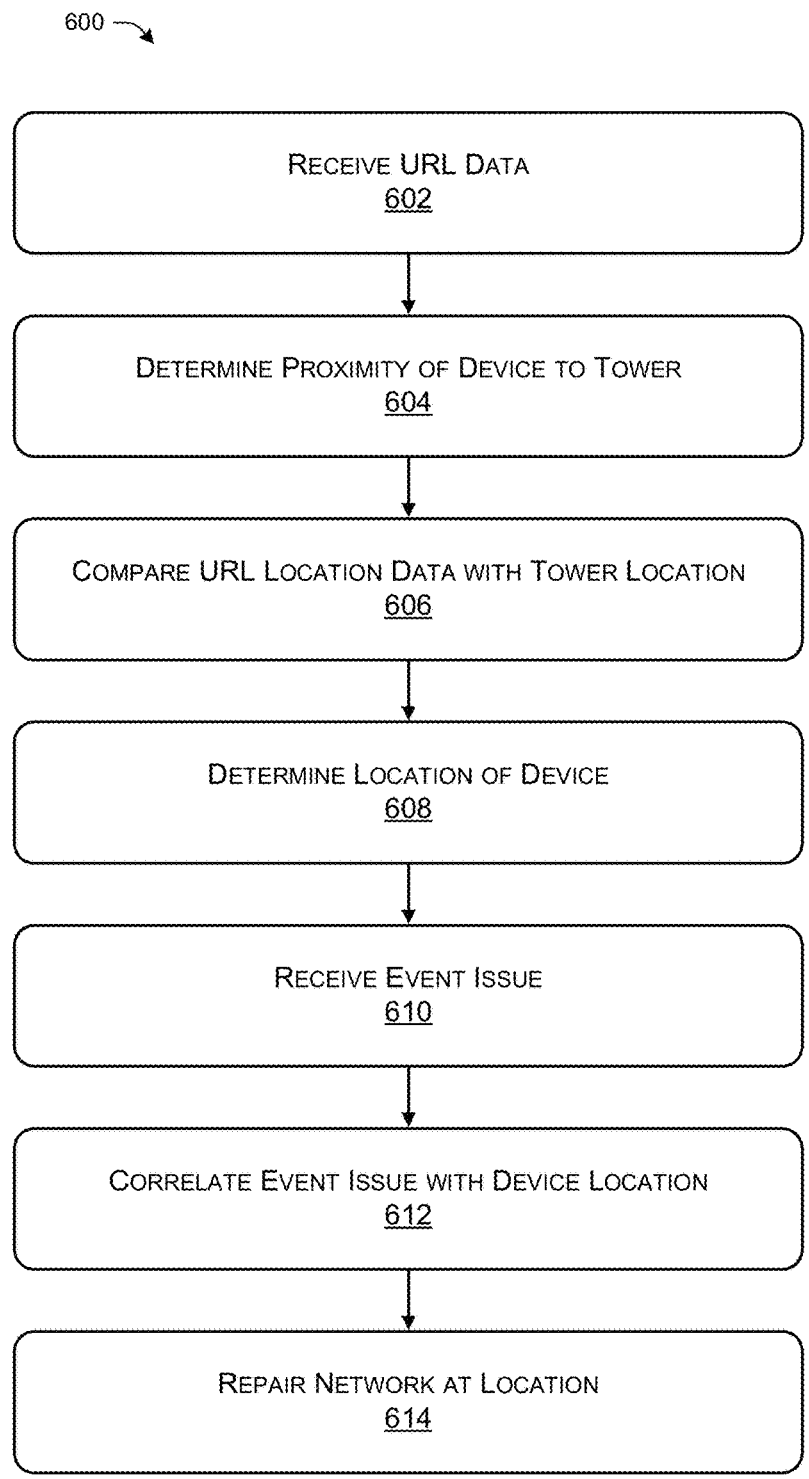
FIG. 6 illustrates an example process for repairing a network by verifying geographic from a communication session.

FIGS. 5 and 6 are flow diagrams showing several illustrative routines for repairing a network by extracting geographic coordinates from a communication session, according to embodiments disclosed herein. It should be appreciated that the logical operations described herein with respect to FIGS. 5 and 6 are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. Moreover, it should be appreciated that the described operations may be performed on multiple computing systems, including systems operated or controlled by various parties. It should also be appreciated that more or fewer operations may be performed than shown in the figures and described herein. These operations may also be performed in parallel, or in a different order than those described herein.

With reference to FIG. 5, an example process 500 for a repairing a network by extracting geographic coordinates from a communication session is illustrated. At block 502, a call log is received. The call log may be stored in a single, or in multiple databases having varying data structures. The call log may additionally receive input from many sources. As an example, a voice call routed through the network of a radio access provider may pass through ten, twenty, thirty, or more servers, and each one of the servers may record call log data which can be stored in the call log.

At block 504, a location log is received. As described herein, a location service may execute a probabilistic model to conjecture at the precise location of a mobile computing device, which may be based upon signal strength from towers operating within the network of the radio access provider.

At block 506, an event log is received. The event log may be created by one or more servers that are part of the network of the radio access provider. The event log may collect data regarding calls as they are routed through the network of the radio access provider, and may be sent to the central servers for storage and/or processing. The event log may include the time, the event, the TSI, and the subscriber ID. However, there is no location data that can be collected as part of the event log.

At block 508, an event issue is identified. An event issue may include any sort of issue that has a tendency to reduce the overall customer experience and may include, without limitation, a dropped call, a reduction in available bandwidth or download speed, an increase in data buffering times, a reduction in audio or video quality, or a denial of service. In order to effectively investigate the reasons for the event issue, it is often helpful to correlate the location with the event issue.

At block 510, a correlation is created between the event, the time, the geolocation, and the device ID. This allows a radio access provider to evaluate and investigate the issue.

At block 512, the network is repaired at the geolocation associated with the event. The repair may be any form that is calculated to improve the coverage and/or reliability of the network and may include allocating additional bandwidth, adding available spectrum, optimizing the spectrum, adding additional towers, or some other measure to improve the network.

With reference to FIG. 6, an example process 600 for a repairing a network by extracting geographic coordinates from a communication session is illustrated. At block 602, URL data is received. The URL data may include coordinates, and may include multiple sets of coordinates. However, there is no guarantee that the coordinates included in a URL is accurate.

At block 604, the proximity of a mobile computing device to a tower is determined. This may be determined, for example, by signal strength, by time to arrival, or by some other suitable method.

At block 606, the URL location data is compared with the tower location. This allows the URL location data to be verified. For example, where the URL location data includes multiple sets of coordinates, those coordinates can be compared with the location of the tower through which the mobile computing device is communicating. Based upon the signal strength of the mobile computing device, its relative distance from the tower can be ascertained and compared with the URL location data to verify whether one or none of the coordinates included in the URL location data is reasonable.

At block 608, the location of the device is determined. If the coordinates in the URL location data can be verified in light of the proximity of the mobile computing device to a tower, then the URL location data can be inferred as the location of the mobile computing device.

At block 610, an event issue is received. As described, an event issue may be any issue that degrades the overall reliability, speed, or quality of the communication session.

At block 612, the event issue is correlated with the device location. This provides an association between an issue with the network and a location at which customers are experiencing event issues.

At block 614, the network can be repaired at the location. The repair may be any form that is calculated to improve the coverage and/or reliability of the network and may include allocating additional bandwidth, adding available spectrum, optimizing the spectrum, adding additional towers, or some other measure to improve the network.

Many radio access providers may be able to determine that there are issues with a network. For example, it may be known than a mobile communication device is buffering a media stream, and in fact, may buffer longer at one location compared with a second location. However, the radio access provider may not be able to determine why the communication device is buffering differently at various locations, and even more problematic is that the location information may only identify which tower the communication device is connected to.

Similarly, the radio access provider may determine that calls are being dropped from a particular tower, but cannot determine locations within the coverage area of the tower that its subscribers are encountering the dropped call events. According to embodiments described herein are systems and methods for determining an event, the identification of the subscriber, and the precise location at which the event occurs.

The result is not only improved geolocation information that can be derived, calculated, or verified based upon an number of data sources including, without limitation, signal strength, time of arrival, triangulation, trilateration, multilateration, a GPS system of the mobile computing device, or location data embedded within a URL, but also provides an improvement to a wireless network by allowing event issues to be geolocated. The end effect is the ability to precisely locate weak spots in a telecommunications network so the network can be improved in terms of coverage and reliability to enhance the overall customer experience.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method of improving coverage in a cellular network, comprising:
   receiving, from a call log, call data comprising an event identifier and a device identifier that identifies a communication device associated with the event;
   receiving, from a location log, location data comprising a time of the event, a temporary subscriber identifier and GPS coordinate information;
   receiving, from an event log, event log data comprising the time of the event, the temporary subscriber identifier and the device identifier;
   associating at least (i) the time of the event from the location log and (ii) the temporary subscriber identifier from the location log with at least (iii) the time of the event from the event log and (iv) the temporary subscriber identifier from the event log to provide first associated data;
   associating at least the device identifier from the call log with the device identifier from the event log to provide second associated data;
   based at least in part on the first associated data and the second associated data, generating a correlation between the event and the GPS coordinate information; and
   repairing the cellular network at a location associated with the GPS coordinate information.

2. The method of claim 1, wherein the GPS coordinate information is determined, at least in part, upon a signal strength of a radio signal received by the communication device.

3. The method of claim 1, wherein the GPS coordinate information is extracted from a data request from the communication device.

4. The method of claim 3, wherein the GPS coordinate information is included in a URL request sent from the communication device.

5. The method of claim 1, further comprising determining a distance of the communication device from a radio access tower by one or more of triangulation, signal strength, time of arrival, trilateration, or multilateration.

6. A system, comprising:
   one or more processors;
   non-transitory computer-readable media storing instructions that, when executed by the one or more processors, cause the one more processors to perform acts, comprising:
      receiving, from a call log, call data comprising an event identifier and a device identifier that identifies a communication device associated with the event;
      receiving, from a location log, location data comprising a time of the event, a temporary subscriber identifier and GPS coordinate information;
      receiving, from an event log, event log data comprising the time of the event, the temporary subscriber identifier and the device identifier;
      associating at least (i) the time of the event from the location log and (ii) the temporary subscriber identifier from the location log with at least (iii) the time of the event from the event log and (iv) the temporary subscriber identifier from the event log to provide first associated data;
      associating at least the device identifier from the call log with the device identifier from the event log to provide second associated data;
      based at least in part on the first associated data and the second associated data, generating a correlation between the event and the GPS coordinate information; and
      repairing the cellular network at a location associated with the GPS coordinate information.

7. The system of claim 6, wherein the GPS coordinate information is determined, at least in part, upon a signal strength of a radio signal received by the communication device.

8. The system of claim 6, wherein the GPS coordinate information is extracted from a data request from the communication device.

9. The system of claim 8, wherein the GPS coordinate information is included in a URL request sent from the communication device.

10. The system of claim 6, wherein the acts further comprise determining a distance of the communication device from a radio access tower by one or more of triangulation, signal strength, time of arrival, trilateration, or multilateration.

* * * * *